United States Patent [19]
Moule

[11] 3,916,174
[45] Oct. 28, 1975

[54] ELECTRONIC FABRIC LENGTH MEASURING AND COST CALCULATING SYSTEM

[75] Inventor: Rex E. Moule, Indialantic, Fla.

[73] Assignee: G & S Manufacturing Co., Inc., South Charleston, W. Va.

[22] Filed: Dec. 5, 1973

[21] Appl. No.: 421,861

[52] U.S. Cl. ............... 235/151.32; 33/129; 33/133; 235/92 DM; 235/92 EV
[51] Int. Cl.² ...................... G06F 15/20; G01B 3/12
[58] Field of Search ..... 235/151.32, 92 DM, 92 PE, 235/92 EV, 92 DN, 92 MP; 33/127, 128, 129, 133

[56] References Cited
UNITED STATES PATENTS

| | | | |
|---|---|---|---|
| 1,434,998 | 11/1922 | Hosch | 33/133 |
| 1,738,546 | 12/1929 | Wheeler | 33/133 |
| 3,169,185 | 2/1965 | Nines | 235/92 DM |
| 3,199,391 | 8/1965 | Haner et al. | 235/151.32 |
| 3,406,601 | 10/1968 | Clifford | 235/151.32 |
| 3,564,216 | 2/1971 | Laycak | 235/92 EV |
| 3,591,776 | 7/1971 | Sylvester | 235/151.32 |
| 3,676,652 | 7/1972 | Millis, Jr. et al. | 235/151.32 |
| 3,696,236 | 10/1972 | Kus | 235/92 DM |
| 3,739,276 | 6/1973 | Dornberger | 33/129 |

Primary Examiner—Malcolm A. Morrison
Assistant Examiner—Errol A. Krass
Attorney, Agent, or Firm—Burns, Doane, Swecker & Mathis

[57] ABSTRACT

An electronic system for rapidly and accurately measuring and displaying fabric length and for calculating and displaying the total cost of the measured fabric as the desired length of fabric is removed from a roll or bolt for retail sale thereof. The fabric is drawn over a measuring roller in engagement therewith and a digital signal related to fabric length is generated and displayed. The fabric length signal is multiplied by price per unit length and the resultant cost of the measured fabric may also be displayed. The system includes provision for resetting the electronic circuitry at the beginning of each measurement and for preventing movement of the measuring roller between measurements.

17 Claims, 7 Drawing Figures

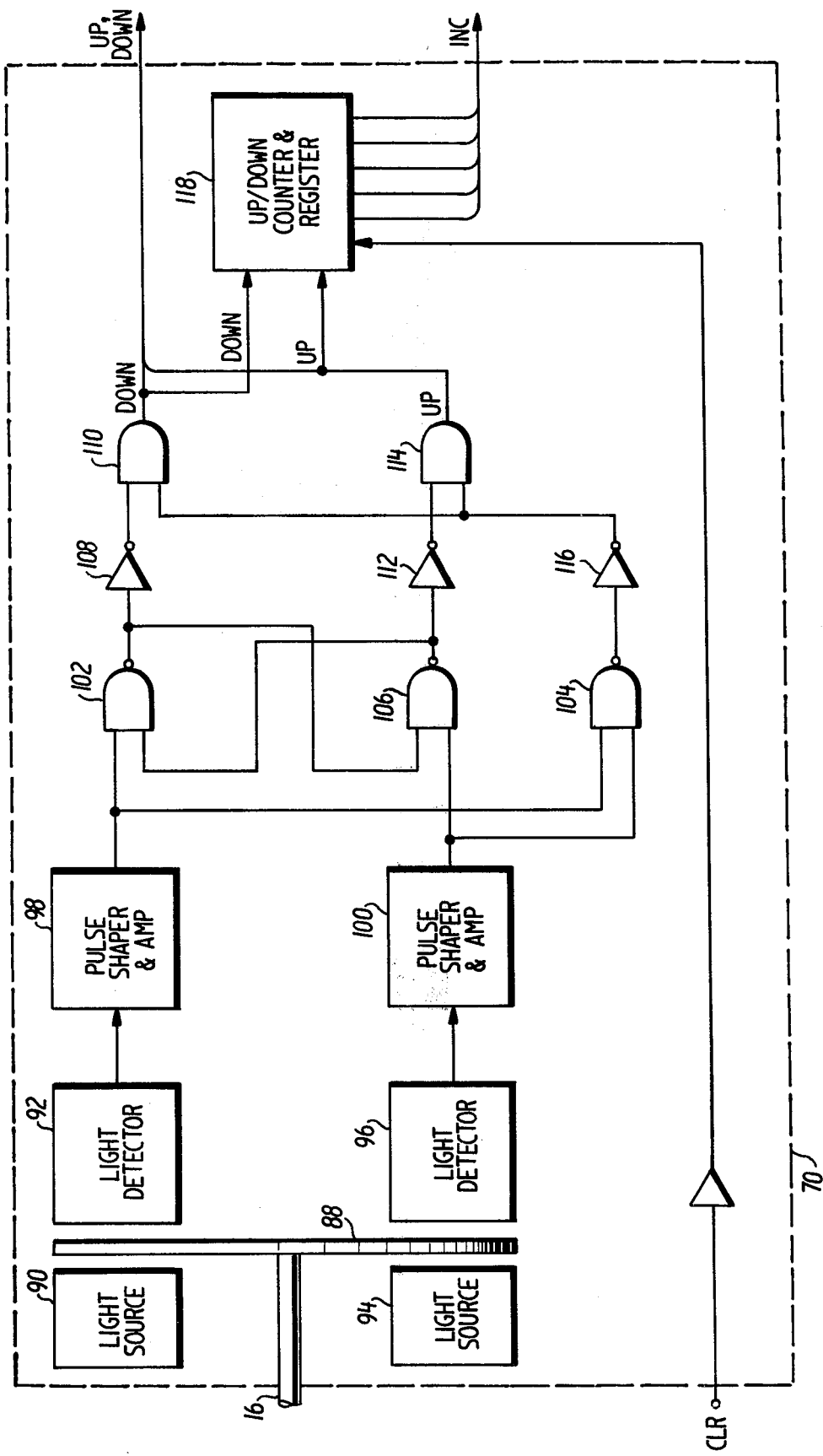
FIG. 5 PULSE SORTER & INCREMENT REGISTER

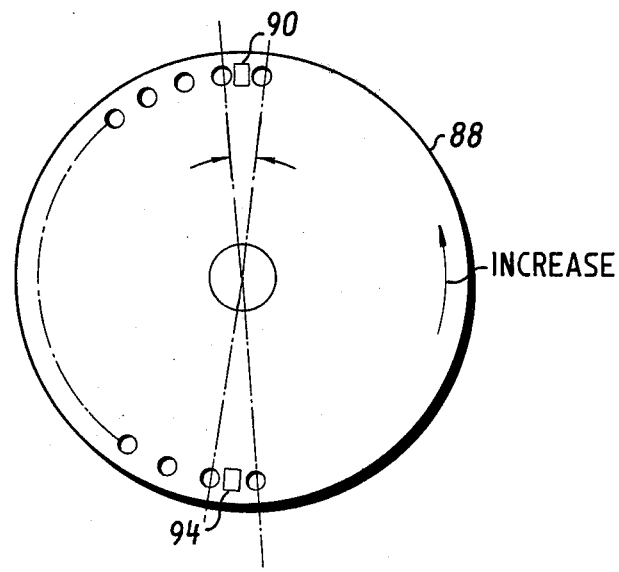
FIG. 5A
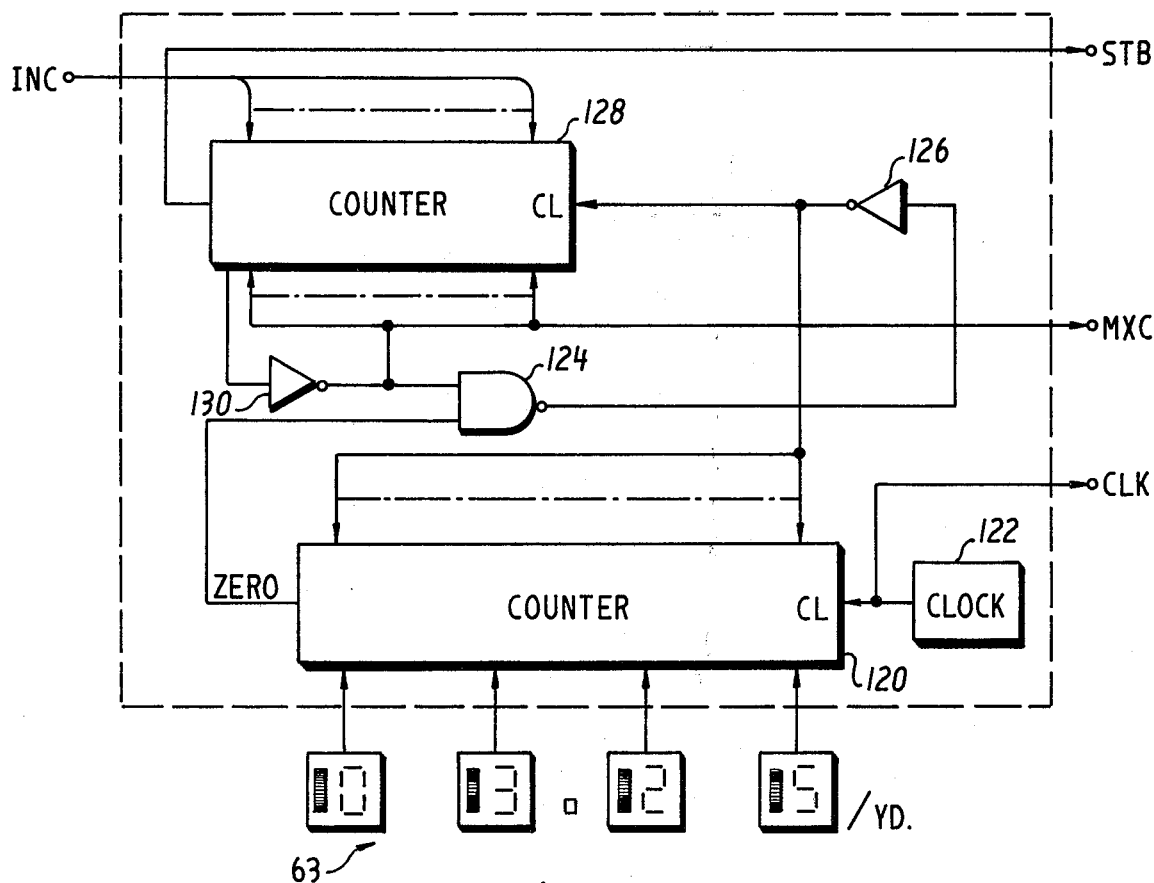
FIG. 6 MULTIPLIER

ELECTRONIC FABRIC LENGTH MEASURING AND COST CALCULATING SYSTEM

BACKGROUND OF THE INVENTION

The present invention relates to retail fabric measuring systems and, more particularly, to an electronic system for measuring the length of fabric and for calculating the cost of the measured length of fabric in the retail sales of fabric.

In retail outlets specializing in the sale of lengths of fabric or cloth, large sales volumes result in a requirement for rapid and accurate measurement of fabric length and calculation of cost for the purchased length. Fabric length measurements have been typically performed in such retail outlets through the use of mechanical devices which provide a mechanical readout of length on a dial. These devices, in addition to being entirely mechanical, typically operate on an analog basis and have no provision for the automatic calculation of fabric cost. Cost calculations are ordinarily performed manually by the operator independently of the measuring device once the desired fabric length has been measured.

It is accordingly an object of the present invention to provide an electronic device for rapidly and accurately measuring and displaying fabric length digitally.

It is another object of the present invention to provide a novel digital fabric measuring and cost calculating device in which a digital signal related to fabric length is incremented and decremented in response to the direction and degree of movement of the fabric through the device and in which fabric cost is automatically calculated for the measured length of fabric.

These and other object and advantages are accomplished in accordance with the present invention as will hereinafter become apparent to one skilled in the art to which the invention pertains from the appended claims and from a reading of the following detailed description in conjunction with the attached drawings.

BRIEF DESCRIPTION OF THE DRAWINGS

FIG. 5 is a functional block diagram of the pulse sorter and increment register of FIG. 4;

FIG. 5A is a view in elevation schematically illustrating the length signal encoder assembly of FIG. 5.

DETAILED DESCRIPTION

Figure 1:
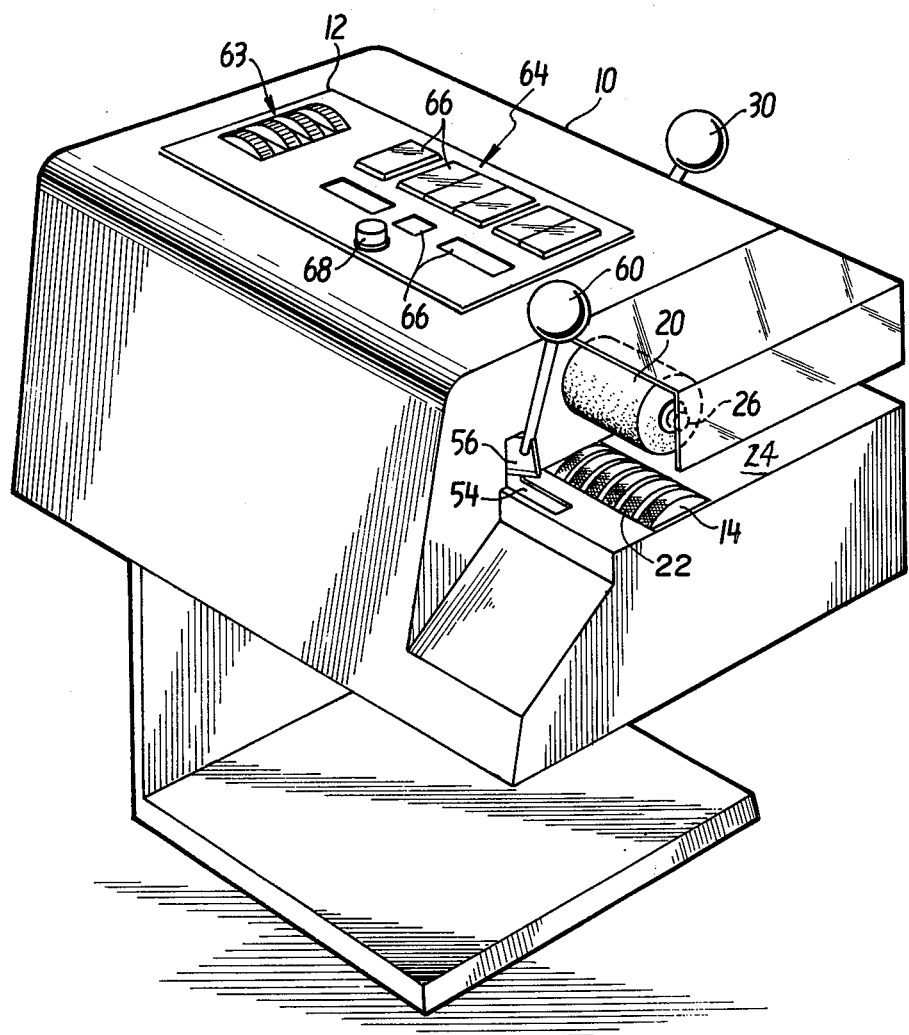
FIG. 1 is a pictorial representation of one embodiment of the present invention.
Figure 2:
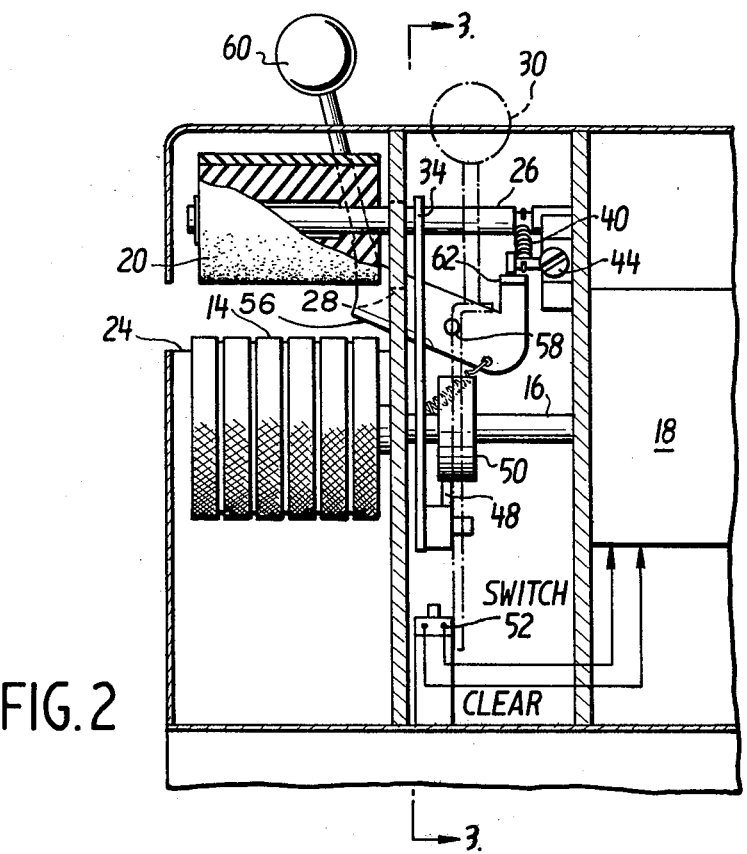
FIG. 2 is a view in elevation and in cross section of a portion of the embodiment of FIG. 1 as viewed from the right side of FIG. 1.
Figure 3:
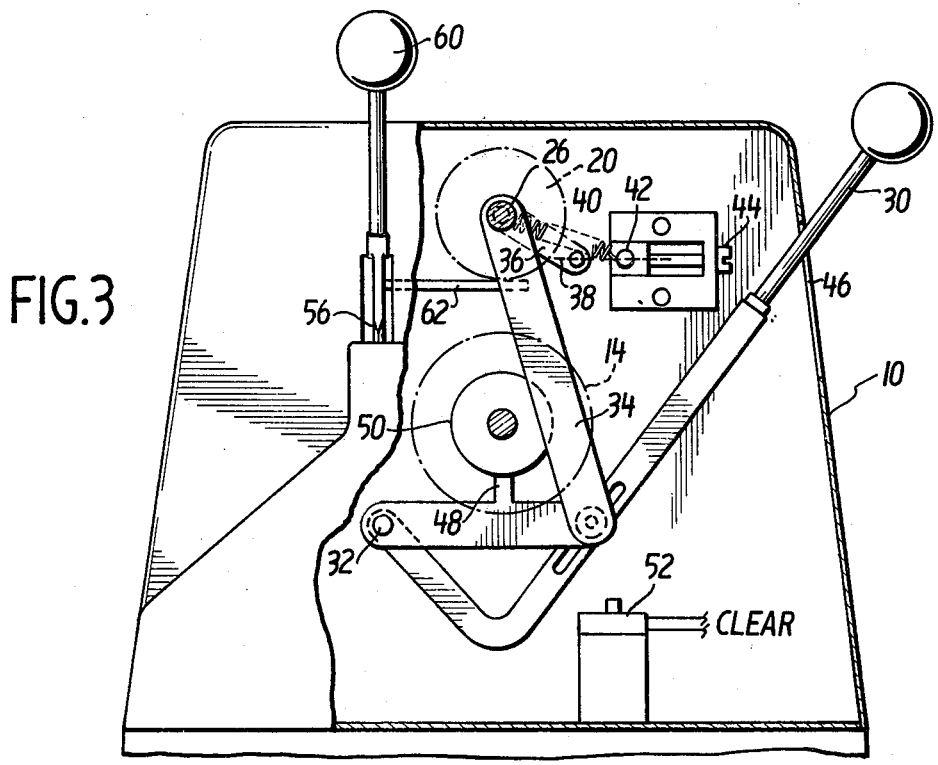
FIG. 3 is a view in elevation and in cross section of the embodiment of FIG. 1 taken along the line III—III in FIG. 2.

A preferred embodiment of the present invention in its assembled form is illustrated pictorially in FIG. 1 and in partial cross section in FIGS. 2 and 3. Referring now to FIG. 1, the fabric measuring and cost calculating apparatus of the present invention preferably includes a housing 10 having a display and control panel 12 mounted in a position which facilitates the viewing of controls and displays thereon.

An input or measuring roller 14 is mounted at one end of the housing 12 in a generally horizontal position. The roller 14 is preferably mounted on a generally horizontal disposed axle 16 (FIG. 2) which extends into the housing 10 and is journaled for rotation. The axle 16 cooperates with electronic circuitry 18 in the housing 12 to provide a digital signal related to fabric length as will hereinafter be described in greater detail. The circumferential surface of the roller 14 is preferably knurled or otherwise roughened and extends through a generally rectangular aperture 22 formed in a flat, horizontal surface 24 of the housing 10. The circumferential surface of the roller 14 thereby contacts the fabric to be measured as the fabric is drawn over the surface 24 and the roller 14.

A pressure roller 20 having a surface coating of rubber or other suitable material is mounted above the roller 14 and is journaled for rotation about an axle 26 (FIGS. 2 and 3) generally parallel to the axle 16 of the roller 14. The axle 26 of the roller 20 extends into the housing 10 through a vertically disposed slot 28 and is mechanically coupled to a lever arm 30 which controls the vertical position of the roller 20. The vertical slot 28 extends downwardly sufficiently to permit the surface of the roller 20 to be lowered into contact with the surface of the roller 14. The surfaces of the fabric to be measured may thereby be selectively engaged between the surfaces of the rollers 14 and 20.

To selectively control the vertical position of the roller 20 between an up position and a down position through movement of the lever arm 30, the lever arm 30 may be mounted for pivotal movement about a pivot point 32 and may slidably engage a roller positioning linkage 34. The linkage 34 may also be pivotally mounted about the pivot point 32 at one end thereof and may be suitably connected to the axle 26 of the pressure roller 20 adjacent the other end thereof.

The axle 26 of the pressure roller 20 may also be engaged by a pivot bar 36 mounted for pivotal movement about a horizontal pivot axis 38. A spring 40 adjustably secured at one end 42 thereof approximately in the horizontal plane of the pivot axis 38 may be connected to the axle 26 to bias the roller into either a full up or full down position, depending upon the vertical position of the axle 26 relative to the pivot axis 38. Spring tension may be adjusted by a suitably arranged adjustment screw 44 accessible through a hole 46 through the housing 10.

To secure the roller 14 against rotation when the pressure roller 20 is in its up position, a stub 48 projecting upwardly from the linkage 34 may frictionally or otherwise engage a cam 50 mounted on the axle 16 of the roller 14 when the roller 20 is in its up position. In addition, the linkage 34 may actuate a switch 52 in its lowermost position or may otherwise provide an electrical signal to indicate the lowering of the roller 20 into contact with the roller 14. The signal supplied from the switch 52 may be applied to the electronic circuitry 18 as a CLEAR signal to reset the circuitry as will hereinafter be described.

The surface 24 of the housing 10 may also be provided with a slot 54 running generally parallel to the axes of the rollers 14 and 20 and spaced a predetermined lateral distance therefrom. A pivotally mounted cutter or notcher 56 biased upwardly in the position illustrated may be pivotable about an axis 58 for vertical movement downwardly into the slot 54 in response to the depression of a lever arm 50 by the operator.

The notcher 56 may be provided with a member 62 extending transversely beneath the axle 26 of the roller 20. The member 62 thus moves upwardly in response to the lowering of the notcher 56 into the slot 54 and contacts the axle 26, forcing the axle 26 and the roller 20 upwardly into the upwardly biased and held position thereof.

In employing the apparatus of the present invention to measure fabric length and calculate cost, the cost of the fabric per unit length may be preset by a plurality of manually operable thumbwheel switches 63 or in any other suitable manner. One edge of the fabric may be inserted between the rollers 14 and 20 with the leading end of the fabric aligned approximately with the slot 54. The lever arm 30 may then be moved downwardly to lower the roller 20 and engage the fabric between the surfaces of the rollers 14 and 20. Engagement of the fabric between the rollers in this manner resets the electronic circuitry 18, zeroing a digital display 64 as will hereinafter be described in detail.

The fabric may then be drawn over the surface of the roller 14 and, because of the frictional engagement between the surface of the fabric and the surface of the roller 14, the roller 14 will rotate in response to this movement of the fabric thereover. The axle 16 of the roller 14 is operatively connected to the electronic circuitry 18 within the housing 10 and, as will be hereinafter be described in greater detail, the rotation of the roller 14 results in the generation of an electrical signal related to fabric length. Because the circumference of the roller 14 is a predetermined length, each revolution of the axle 16 in one direction increments the generated electrical signal by a predetermined amount and each revolution in the other direction decrements the signal by the amount. In the preferred embodiment of the invention, the circumference of the measuring roller 14 is 4½ inches or exactly ⅛ yard so that each complete revolution of the roller 14 and axle 16 represents an increment of fabric length of ⅛ yard. The digital length related signal is also incremented and decremented in accordance with fractional portions of a revolution of the rollers 14, e.g., 1/10 inch, to facilitate the generation of an accurate display of fabric length.

The length related signal may be coupled to the control and display panel 12 to provide a continuously updated indication of fabric length. For this purpose, the display and control panel 12 preferably includes a digital display 64 such as a plurality of conventional 7 segment, luminous display tubes. The length measurement is preferably displayed on the display 64 in yards, ⅛ yard and inches as will be discussed hereinafter in greater detail. Selectively illuminated indicia 66 such as name plates identifying the units of the displayed digits and other desired information may also be provided.

When the length of the fabric displayed on the display 64 corresponds to that length requested by the customer, the operator may depress a cost switch 68 to display the total cost of that length of fabric on the display 64. Depression of the cost switch may also selectively illuminate indicia such as a dollar sign and may illuminate a decimal point at an appropriate location on the display 64. Since it may be desirable to display cost continuously, a separate digital display (FIG. 4) may be provided and the function of the cost display switch 68 eliminated.

The cost figure may be calculated as will hereinafter be described in greater detail by the electronic circuitry 18 within the housing 10 and may be based upon the product of the length of fabric measured and the cost per unit length preset by the operator on the thumbwheel switches 63. To mark the fabric at a point corresponding to the displayed length, the lever arm 60 may be depressed to notch the edge of the fabric with the notcher 56. Since the slot 54 with which the notcher 56 cooperates determines both the starting and ending points of the fabric measurement, the resultant measurement is quite accurate insofar as the mechanical aspects of the invention are concerned. As will hereinafter be seen, the electronic circuitry 18 provides a measurement to the nearest 1/10 of 1 inch and therefore the overall accuracy of the length measurement may be held to within approximately 1/10 of an inch.

Depression of the lever arm 60 to notch the fabric automatically releases the pressure roller 20 permitting the removal of the fabric from the apparatus and the severing of the measured portion from the bolt of fabric. The roller 14 is secured against movement through engagement of the cam 50 by the stub 48 and the length information is retained in the electronic circuitry 18 until the circuitry is reset through depression of the lever arm 30 to commence a new measuring operation.

Figure 4:
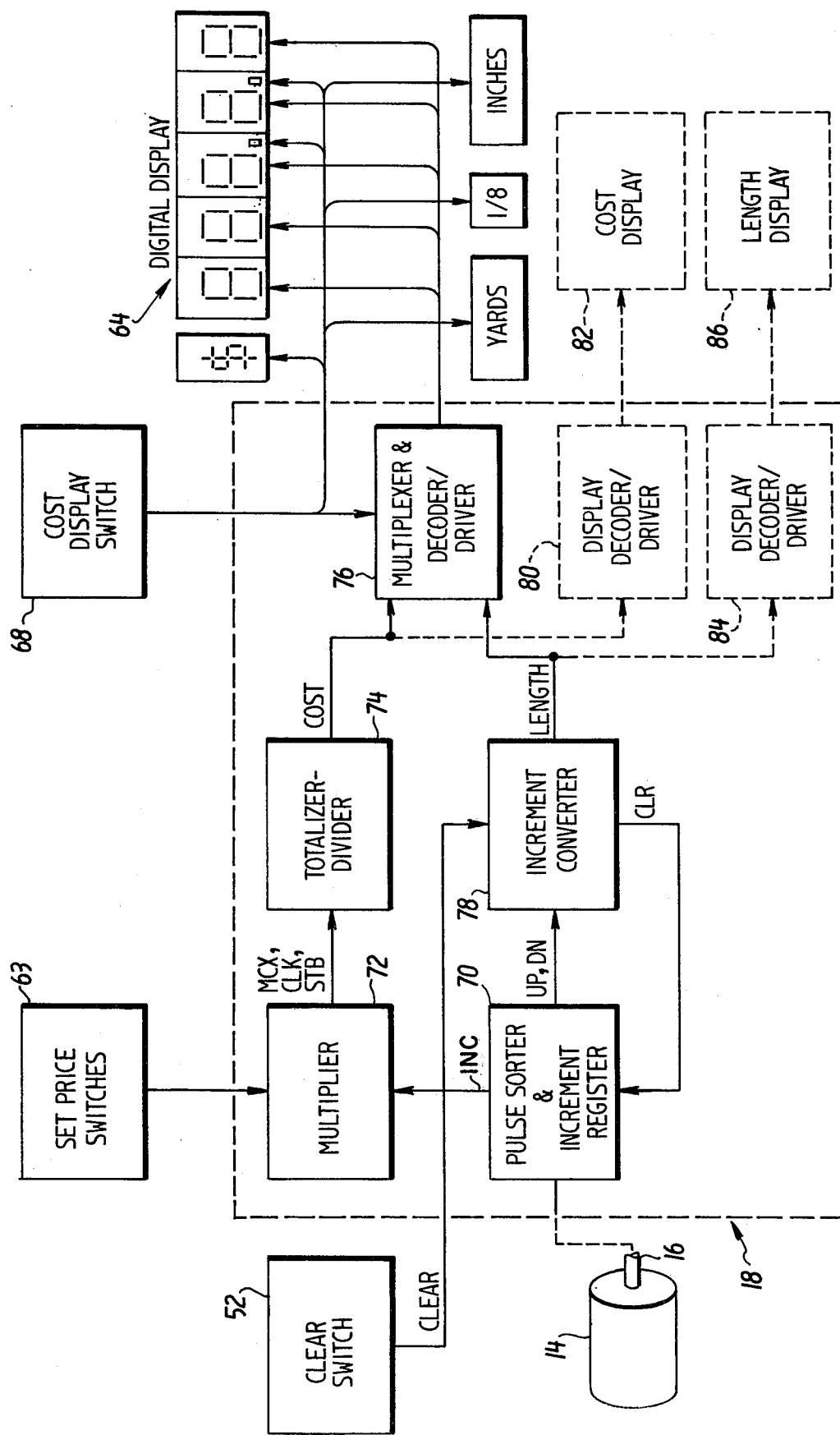
FIG. 4 is a functional block diagram of the electronic circuitry of FIGS. 1-3.

In FIG. 4, the electronic circuitry 18 generally described in connection with FIGS. 1–3 is illustrated in greater detail. Referring now to FIG. 4, the shaft 16 of the measuring roller 14 may be mechanically linked to a pulse sorter and increment register 70 for generation of an increment signal INC related to total measured fabric length in response to movement of the fabric across the surface of the roll 14 as was previously described. As will hereinafter be described in greater detail, the pulse sorter and increment register 70 detects the direction of rotation of the roller 14 so that the INC signal either increases or decreases as the total fabric length is either increased or decreased. The pulse sorter and increment register 70 may generate UP and DOWN signals indicative of the respective increasing and decreasing of fabric length.

The INC signal from the pulse sorter and increment register 70 may be applied to a conventional arithmetic multiplier 72 for multiplication by a signal representative of the cost of the fabric per unit length. The cost representative signal may be generated by the set price switches 63 as was previously described. A master clear signal MCX, a clock signal CLK and a strobe signal STB generated by the multiplier 72 may be applied to a suitable totalizer-divider 74, and a COST signal representative of the total cost of the measured fabric may be applied to a suitable multiplexer and decoder/driver 76.

The CLEAR signal from the clear switch 52 may be applied to a suitable increment converter 78 together with the up and down signals UP and DN from the pulse sorter and increment register 70. A clear signal CLR from the increment converter 78 may be applied to the pulse sorter and increment register 70 and a LENGTH signal representative of the length of the measured fabric may be supplied from the increment coverter 78 to the mulitplexer and decoder/driver 76. An output signal from the cost display switch 68 may be applied to the selection input terminal of the multiplexer and decoder/driver 76 and a selected one of the cost and length signals may be applied to the digital display 64 as determined by the signal from the cost display switch 68. In addition, a signal from the cost display switch 68 may control the selective illumination of various indicia on the display panel including decimal points on the digital display 64.

In the event that separate displays are provided for cost and length so that both may be simultaneously viewed by the purchaser of fabric, the cost display switch 68 and the multiplexer and decoder/driver 76 need not be provided. In such an alternative embodiment, the COST signal may be suitably decoded and amplified by a conventional display decoder/driver 80 and applied to a suitable cost display 82 as illustrated in phantom. Similarly, the LENGTH signal from the increment converter 78 may be supplied through a display decoder/driver 84 to a suitable length display 86.

In operation and with reference to FIGS. 1–4, the edge of a fabric chosen by a customer is aligned with one edge of the slot 54 and the lever arm 30 is depressed to engage the fabric between the rollers 14 and 20. The cost of the fabric per unit length, e.g., per yard, is set by the operator on the set price switches 63 and the fabric is drawn through the rollers 14 and 20. As the roller 14 rotates, the shaft 16 causes the pulse sorter and increment register 70 to generate either an UP or DN pulse for each increment of fabric drawn over the measuring roller 14. The UP and DN pulses respectively increment and decrement a suitable counter or register in both the pulse sorter and increment register 70 and the increment coverter 78. Of course, the register may be selected or suitably inhibited at zero so that initial movement of the fabric over the measuring roller in a decreasing length direction will not decrement the registers below zero.

Total fabric length in a form suitable for use by the multiplier 72 is supplied thereto by the pulse sorter and increment register 70 in the form of the INC signal. Total fabric length in a form suitable for display is provided to the multiplexer and decoder/driver 76 from the increment converter 78. With the cost display switch 68 in its normally open position, the multiplexer and decoder/driver 76 supplied, as its output signal, the LENGTH signal for display by the digital display 64.

When the desired length of fabric is indicated on the digital display 64, the operator may depress the lever arm 60 to mark that length of fabric. Since the notcher 56 controlled by the lever arm 60 marks the fabric at the same point at which the fabric was positioned in commencing the length measurement, the fabric is marked at the exact length indicated on the display 64. Additionally, depression of the lever arm 60 releases the pressure roller 20 as was previously described so that the fabric may be removed from the measuring apparatus.

Since the total measured length is retained by the pulse sorter and increment register 70 and the increment converter 78, total fabric length is available for display and is also available for computing total fabric cost. Total fabric length in the form of the INC signal is multiplied by the price of the fabric per unit length by the multiplier 72 and the result is rounded off to the nearest cent by the totalizer/divider 74 and supplied periodically to the multiplexer and decoder/driver 76 as the COST signal. To display cost in the event that a single digital display is employed, the operator may depress the cost display switch 68 which results in the selection of the COST signal by the multiplexer and decoder/driver 76 for display on the digital display 64. In addition, depression of the cost display switch 68 may operate to extinguish the length indicia and decimal point on the display panel and to illuminate the dollar sign and the appropriate cost decimal point on the display panel.

Of course, in the event that separate cost and length displays are employed as is illustrated in phantom, the need for this final operation, i.e., the depression of the cost display switch 68, is eliminated.

One embodiment of the pulse sorter and increment register 70 of FIG. 4 is illustrated in greater detail in FIG. 5 to facilitate an understanding of the invention. Referring now to FIG. 5, the shaft 16 of the measuring roller 14 may be connected to a suitable encoding disc 88 associated with a first light source and light detector pair 90–92 and a second light source and light detector pair 94–96. The output signals from the light detectors 92 and 96 may be applied through suitable pulse shapers and amplifiers 98 and 100 respectively. The output signal from the pulse shaper and amplifier 98 may be applied to one input terminal of a two input terminal NAND gate 102 and to one input terminal of a two input terminal NAND gate 104. The output signal from the pulse shaper and amplifier 100 may be applied to one input terminal of a two input terminal NAND gate 106 and to the other input terminal of the NAND gate 104.

The output signal from the NAND gate 102 may be applied to the other input terminal of the NAND gate 106 and through an inverter 108 to one input terminal of an AND gate 110. The output signal from the NAND gate 106 may be applied to the other input terminal of the NAND gate 102 and through an inverter 112 to one input terminal of a two input terminal AND gate 114. The output signal from the NAND gate 104 may be applied through an inverter 116 to the other input terminal of each of the AND gates 110 and 114. The DOWN signal and the AND gate 110 may be provided as an output signal for application to the increment converter 78 together with the UP signal from the AND gate 114. The DOWN and UP signals may also be applied to the respective down and up input terminals of a suitable conventional up/down counter and register 118. The CLR signal from the increment converter 78 of FIG. 4 may be amplified and applied to the clear or reset input terminal of the counter and register 118 and the ouput signal from each stage of the counter and register 118 may be supplied as the collectively illustrated INC signal to the multiplier 72 of FIG. 4.

In operation and with reference to FIGS. 5 and 5A, rotation of the shaft 16 in response to movement of fabric in engagement with the surface of the roller 14 results in the generation of pulses which are either DOWN or UP pulses, depending upon the direction of rotation of the roller and shaft. In this regard, the encoder 88 may be provided with apertures at regularly spaced, angular intervals each representing a predetermined increment of fabric length. In the preferred embodiment of the invention, this increment is chosen as 1/10 of one inch so that if one entire revolution of the roller 14 represents ⅛ of one yard or 4½ inches, the apertures through the encoder 88 may be disposed along the circumference of the encoder disc at 8° intervals. Thus, as is generally indicated in FIG. 5A, 45 apertures spaced at 8° intervals may be provided around the periphery of the disc 88.

The light sources 90 and 94 and their associated detectors 92 and 96 may be positioned in such a way that as fabric length increases and the disc 88 rotates in an "increasing" direction, light from the light source 94 passes through an aperture and strikes the light detector 96 just prior to detection of the light from the light source 90 by the light detector 92. Thus, as fabric length increases the NAND gate 106 is enabled and provides an UP output signal from the AND gate 114 while simultaneously inhibiting the NAND gate 102. The subsequent pulse generated by the light detector 92, while enabling and AND gate 114 by way of the NAND gate 104 and inverter 116, cannot be passes by the NAND gate 102. It will thus be readily appreciated that an UP pulse is generated for each predetermined increment of fabric length as the measured fabric length increases whereas no DOWN pulses are generated in this increasing direction. Similarly, when the fabric passed drives the encoder 88 in a "decreasing" direction, a DOWN pulse is generated for each predetermined increment of fabric length while the generation of the UP pulses is inhibited.

The UP and DOWN pulses are counted by the up/down counter and register 118 and thus the INC output signal is indicative of the total measured fabric length. Since the CLR signal resets the counter and register 118 at the beginning of each measurement, the new measurement is unaffected by previous measurements.

With reference again to FIG. 4, it can thus be seen that the UP and DOWN signals may also be counted by a suitable up/down counter in the increment converter 78 and converted into a signal appropriate for display by the digital display 64. The CLR signal provided to the pulse sorter and increment register 70 from the increment converter 78 may be generated in response to the CLEAR signal from the clear switch 52 and may, in fact, be an amplified replica of CLEAR signal.

One embodiment of the multiplier 72 of FIG. 4 is illustrated in greater detail in FIG. 6 to facilitate an understanding of the operation of the invention. Referring now to FIG. 6, signals representative of the price per unit length of the fabric being measured are supplied from the price set switches 63 to a counter 120 to preset the counter 120 to a predetermined price. A clock signal CLK provided by the suitable clock 122 may be applied to the clock input terminal CL of the counter 120 and may be provided at an output terminal for application to the totalizer-divider 74 of FIG. 4.

The present counter 120 is clocked by the CLK signal until a count of zero is reached at which time a zero signal is applied from the counter 120 to one input terminal of a two input terminal NAND gate 124. The output signal from the NAND gate 124 is applied through an inverter 126 to the clock input terminal CL of a counter 128 and to the preset input terminals of each stage of the counter 120. The increment signal INC indicative of total fabric length is applied to the appropriate stages of the counter 128 to preset the counter 128 to the measured fabric length. Each ZERO signal from the counter 120 clocks the counter 128 by way of the NAND gate 124 and inverter 126 from the preset value of fabric length toward zero. When the counter 128 reaches a count of zero, the strobe signal STB is generated and applied to the CL input terminal of the counter 128 effects the generation of a master clear signal MCX by way of an inverter 130. The MXC signal is applied to the totalizer-divider 74 of FIG. 4, to a second input terminal of a NAND gate 124 and to the preset input terminals of the stages of the counter 128 as illustrated.

With the arrangement illustrated in FIG. 6, the number of clock pulses CLK generated between the generation of the MCX and STB signals in indicative of the product of the price per unit length and the total length of the fabric. The totalizer-divider 74 may therefore include a counter which counts the clock pulses CLK generated between successive MCX and STB pulses to thus provide an indication of total fabric cost. Since the fabric is measured in increments of 0.1 inch in the preferred embodiment, the totalizer-divider 74 may divide the total cost indicated by the counted clock pulses by a factor of 360 to provide the COST signal. The COST signal may then be displayed as was previously described.

Since the mulitplier 72 continuously cycles through the multiplication operation using current values of price and length, the resultant COST signal is continuously being updated. If a mistake is made in setting the price set switches 63, the operator need only correct the switch positions and the correction will be reflected in the updated value of the COST signal.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for measuring and displaying the length of a fabric comprising:
   a first roller journaled for rotation;
   means operatively connected to said first roller for generating a first digital electrical signal representative of fabric length in response to movement of the fabric across said first roller, said first signal generating means comprising:
      a rotatable member coupled for rotation in response to rotation of said first roller;
      detector means positioned in cooperative relation with said member for generating first and second pulses in response to predetermined intervals of angular rotation of said member, said predetermined intervals of angular rotation each representing a predetermined increment of fabric length, said detector means cooperating with said member to generate, non-coincidently, said first and second pulses at different angular orientations of said member;
      means for receiving said first and second pulses and generating a direction indicative signal indicating direction of rotation of said first roller in response to the time interval between receipt of said pulses and the order of receipt of said pulses; and
      means responsive to said generated pulses and said direction indicative signal for counting said generated pulses, said counting means being incremented in response to said pulses and rotation of said first roller in one direction and being decremented in response to said pulses and rotation of said first roller in the other direction, the count in said counting means providing said first digital signal;
   means for selectively providing a second digital electrical signal representative of cost of the fabric per unit length measurement;
   means for generating a third digital electrical signal representative of the product of said first and second signals; and, display means responsive to said first and third digital signals for digitally displaying fabric length and fabric cost.

2. The apparatus of claim 1 wherein said rotatable member has a plurality of means for triggering said first and second pulses, which triggering means are regularly spaced at angular intervals on a circumference of said rotatable member, and which triggering means each represent a predetermined increment of fabric length.

3. The apparatus of claim 2 wherein said detector means comprises:
   a first detector for generating said first pulses in response to serial juxtaposition of said triggering means by rotation of said rotatable member; and,
   a second detector for generating said second pulses in response to serial juxtaposition of said triggering means by rotation of said rotatable member, which second detector is displaced from said first detector at a fractional multiple of said regular angular interval at which said triggering means are spaced on said rotatable member.

4. The apparatus of claim 1 wherein said means for selectively providing said second signal comprises a plurality of thumbwheel switches visually marked in dollars and cents, and circuit means for providing said second signal in response to the positions of said switches.

5. The apparatus of claim 1 wherein said display means includes an electronic digital display and switch means for selectively applying one of said first and third signals to said digital display, said switch means being operable to normally apply said first signal to said digital display and to apply said third signal to said digital display in response to the manual depression of said switch means.

6. the apparatus of claim 5 wherein said means for selectively providing said second signal comprises a plurality of thumbwheel switches visually marked in dollars and cents, and circuit means for providing said second signal in response to the positions of said switches.

7. The apparatus of claim 1 wherein said display means comprises first and second electronic digital displays, said first signal being applied to one of said first and second displays and said third signal being applied to the other of said first and second displays.

8. The apparatus of claim 7 wherein said means for selectively providing said second signal comprises a plurality of thumbwheel switches visually marked in dollars and cents, and circuit means for providing said second signal in response to the positions of said switches.

9. The apparatus of claim 1 including:
   a second roller disposed above said first roller in generally parallel relation thereto, said second roller being mounted for generally vertical movement between a first position in which the surfaces of said first and second rollers are spaced and a second position in which the surfaces of said first and second rollers are in contact; and,
   means operatively connected to said first signal generating means for resetting said first signal generating means to zero in response to movement of said second roller from the first to the second positions thereof.

10. The apparatus of claim 9 wherein said display means includes an electronic digital display and switch means for selectively applying one of said first and third signals to said digital display, said switch means being operable to normally apply said first signal to said digital display and to apply said third signal to said digital display in response to the manual depression of said switch means.

11. The apparatus of claim 9 wherein said display means comprises first and second electronic digital displays, said first signal being applied to one of said first and second displays and said third signal being applied to the other of said first and second displays.

12. The apparatus of claim 11 wherein said means for selectively providing said second signal comprises a plurality of thumbwheel switches visually marked in dollars and cents, and circuit means for providing said second signal in response to the positions of said switches.

13. The apparatus of claim 1 including means for marking the fabric at a position generally corresponding to the fabric length displayed by said display means.

14. The apparatus of claim 13 including:
   a second roller disposed above said first roller in generally parallel relation thereto, said second roller being mounted for generally vertical movement between a first position in which the surfaces of said first and second rollers are spaced and a second position in which the surfaces of said first and second rollers are in contact; and,
   means operatively connected to said first signal generating means for resetting said first signal generating means to zero in response to movement of said second roller from the first to the second positions thereof.

15. The apparatus of claim 14 including means operatively connected to said fabric marking means for moving said second roller from the second position to the first position thereof in response to the marking of fabric by said marking means.

16. The apparatus of claim 11 wherein said display means includes an electronic digital display and switch means for selectively applying one of said first and third signals to said digital display, said switch means being operable to normally apply said first signal to said digital display and to apply said third signal to said digital display in response to the manual depression of said switch means.

17. The apparatus of claim 15 wherein said display means comprises first and second electronic digital displays, said first signal being applied to one of said first and second displays and said third signal being applied to the other of said first and second displays.

* * * * *